(12) United States Patent
Randon et al.

(10) Patent No.: US 11,195,330 B2
(45) Date of Patent: Dec. 7, 2021

(54) GENERATION OF A STRUCTURED 3D MODEL FROM A RAW MESH

(71) Applicant: DASSAULT SYSTEMES, Velizy-Villacoublay (FR)

(72) Inventors: Guillaume Randon, Velizy-Villacoublay (FR); Serban Alexandru State, Velizy-Villacoublay (FR); Fernando Manuel Sanchez Bermudez, Velizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 50 days.

(21) Appl. No.: 16/730,795

(22) Filed: Dec. 30, 2019

(65) Prior Publication Data

US 2020/0211279 A1 Jul. 2, 2020

(30) Foreign Application Priority Data

Dec. 29, 2018 (EP) ..................................... 18306888

(51) Int. Cl.
*G06T 17/00* (2006.01)
*G06T 17/10* (2006.01)

(52) U.S. Cl.
CPC .......... *G06T 17/10* (2013.01); *G06T 2200/24* (2013.01)

(58) Field of Classification Search
CPC . G06T 17/00; G06T 17/10; G06T 7/11; G06T 2200/04; G06T 2200/08
See application file for complete search history.

(56) References Cited

PUBLICATIONS

European Search Report dated Jul. 19, 2019 in EP 18 30 6888 filed Dec. 29, 2018.
Rosaline Beniere, et al. "A comprehensive process of reverse engineering from 3D Meshes to CAD models", Computer Aided Design, Dec. 23, 2011, pp. 1382-1393.
Shixin Xú, et al. "STEP-NC based reverse engineering of in-process model of simulation", Int J Adv Manuf Technol, Jan. 26, 2016, pp. 3267-3288.
S Joshi, et al. "Graph based heuristics for recognition of machined features from a 3D solid model", Butterworth & Co. (Publishers) Ltd., vol. 20 No. 2, Mar. 1988, pp. 58-66.
Silvère Gauthier, et al. "Digitized 3D Mesh segmentation based on curvature analysis", HAL , Mar. 24, 2017, pp. 33-38.
S. Gauthier, et al. "Analysis of digitized 3D mesh curvature histograms for reverse engineering", Computer in Industry , Feb. 8, 2017, pp. 67-83.

*Primary Examiner* — Weiming He
(74) *Attorney, Agent, or Firm* — Oblon, McClelland, Maier & Neustadt, L.L.P.

(57) ABSTRACT

The disclosure notably relates to a computer-implemented method for generating a structured three-dimensional (3D) model from a mesh. The method includes obtaining a mesh that comprises faces, each face of the mesh including a normal and principal curvature values; computing a distribution of the principal curvatures values over the whole mesh by counting the number of occurrences of discretized curvature values; identifying in the computed distribution one or more dominant ranges of principal curvature values; for each identified dominant range, computing one or more regions of the mesh that includes faces belonging to the identified dominant range; for each computed region, detecting a primitive type by using the curvatures values of all faces of the region and identifying parameters of the detected primitive by using the mesh surface of the region.

19 Claims, 10 Drawing Sheets

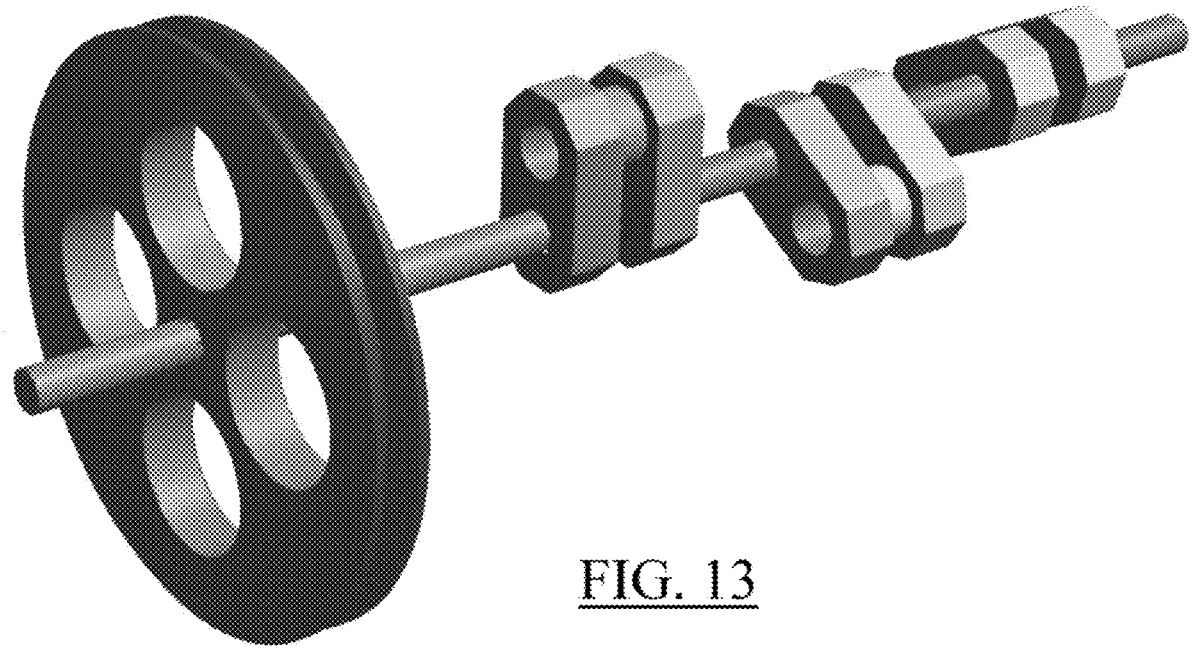
FIG. 13
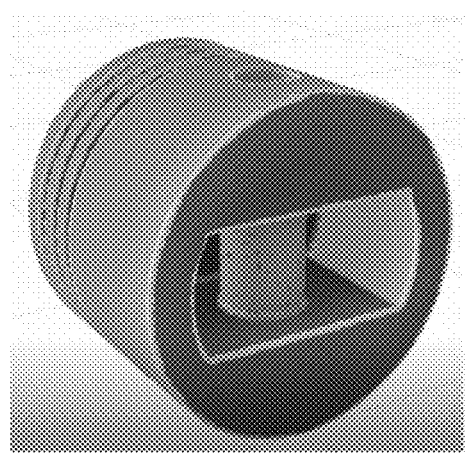 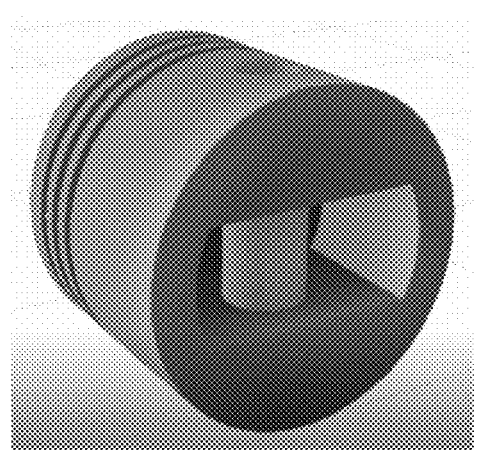
FIG. 14a    FIG. 14b

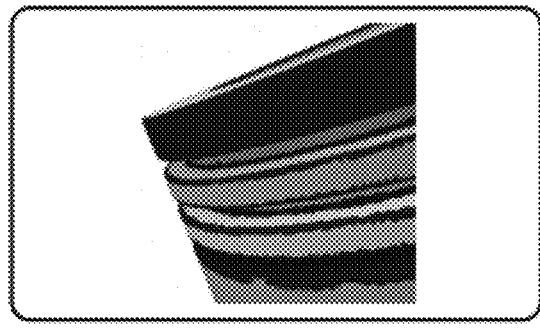
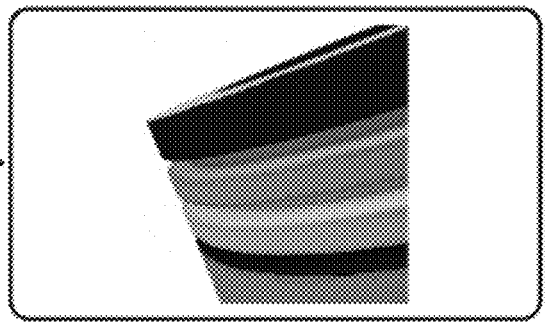
FIG. 15a          FIG. 15b
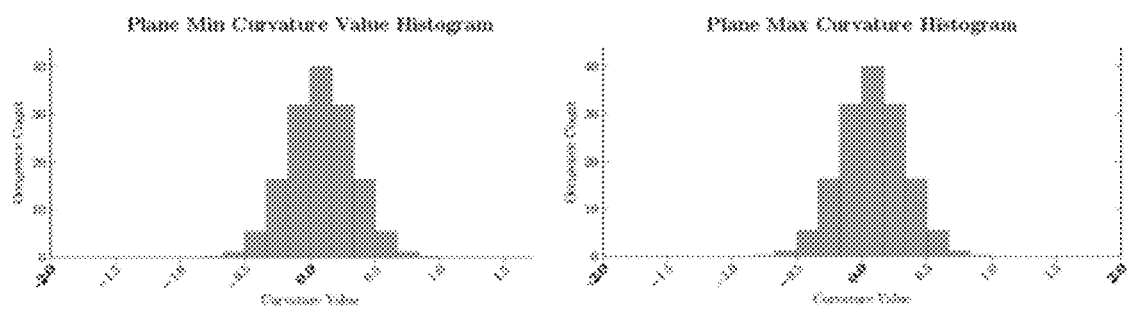
FIG. 16
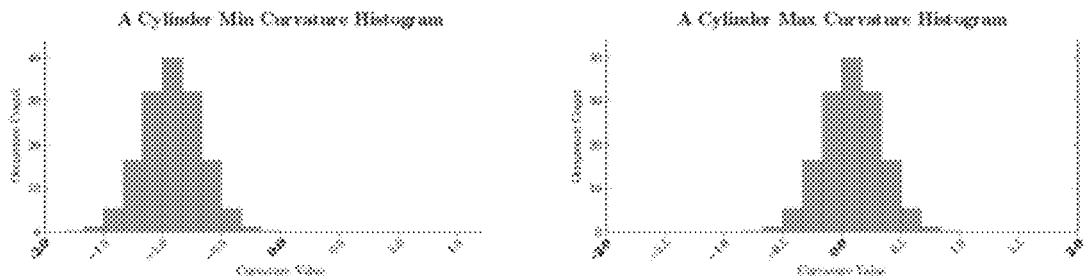
FIG. 17

GENERATION OF A STRUCTURED 3D MODEL FROM A RAW MESH

CROSS-REFERENCE TO RELATED APPLICATIONS

This application claims priority under 35 U.S.C. § 119 or 365 to European Application No. 18306888.1, filed Dec. 29, 2018. The entire contents of the above application(s) are incorporated herein by reference.

FIELD OF THE INVENTION

The disclosure relates to the field of computer programs and systems, and more specifically to a method, system and program for generating a structured three-dimensional (3D) model from a mesh.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

The construction (or the reconstruction) of a structured 3D model from a mesh allows building (or rebuilding) a 3D model that can be used in dedicated software (e.g. CAD/CAE/CAM/PDM/ . . . systems). In other words, an existing mesh can be analyzed for the purpose of extracting the implicit knowledges contained in the mesh. For instance, a mesh representing an object of the real world such as a mechanical part can be produced by metrology precision scanning, but the semantic that is implicitly contained in the mesh cannot be exploited by a modeling software. As another example, a CAD system can emulate tools movements of a tool machines used for manufacturing objects, and can output a mesh from files containing machine commands and specification. Again, reverse engineering these files for obtaining a structured 3D representation is not possible, or very difficult. In another example, the raw mesh representation may be obtained from a structured 3D model, usually for visualization purposes. However, the structure information is lost during the process.

In "Topology Reconstruction for B-Rep Modeling from 3D Mesh in Reverse Engineering Applications, 2012", Bénière et al. have worked intensely on extracting sufficient information from meshes to build back exact B-Rep models using curvature. By analyzing the curvature on the triangles of a mesh with respect to the overall mesh curvature distribution they build sub meshes which are potential candidates to being faces of a B-Rep representation. When the sub meshes do not touch their neighbors, they expand them until they can recover some of the limits between adjacent faces. They expand the sub meshes by aggregating triangles based on a notion of distance to the already built sub mesh. With complex and tortuous geometries this process is not guaranteed to recover valid limits. Besides, this approach focuses only on reconstructing an exact B-Rep.

Hence, being able to reverse the mesh has tremendous value because it allows advanced edition and supports the full range of design tools traditionally offered by CAD/CAE/CAM/PDM/ . . . systems.

Within this context, there is still a need for an improved generation of a structured three-dimensional (3D) model from a mesh.

SUMMARY OF THE INVENTION

It is therefore provided a computer-implemented method for generating a structured three-dimensional (3D) model from a mesh. The method comprises providing a mesh that comprises faces, each face of the mesh including a normal and principal curvature values, computing a distribution of the principal curvature values over the whole mesh by counting the number of occurrences of discretized curvature values, identifying in the computed distribution one or more dominant ranges of principal curvature values, for each identified dominant range, computing one or more regions of the mesh that comprises faces belonging to the identified dominant range, for each computed region, detecting a primitive type by using the curvatures values of all faces of the region and identifying parameters of the detected primitive by using the mesh surface of the region.

The method may comprise one or more of the following:
- building a geometric and adjacency graph of the structured 3D representation of the provided mesh, wherein each node of the graph represents one of the computed regions and comprises the identified primitive type and parameters of the region; and each connection between two nodes is an intersection between the respective surfaces of the regions represented by the nodes;
- the building of a geometric and adjacency graph further comprises, for each connection: each connection between two nodes is an intersection between the respective surfaces of the regions represented by the nodes with associated convexity, concavity and positions information per connection between nodes;
- the identification in the computed distribution of the one or more dominant ranges of principal curvature values comprises determining in the computed distribution a local maximum between two successive local minima, and identifying the faces comprised between the two successive local minima as belonging to the said one or more a dominant range;
- while the number of occurrences for a local maximum is equal and/or above a predetermined value, repeating the determination in the computed distribution a local maximum and the identification of the faces as belonging to the said one or more dominant range, and wherein before each repetition, the faces previously identified as belonging to the said one or more a dominant range are discarded and the distribution of the faces according to their principal curvature values is recomputed;

the principal curvature values of each faces comprise a minimum curvature value and a maximum curvature value; computing the distribution of the faces comprises: computing a first distribution of the minimum curvature values over the whole mesh by counting the number of occurrences of discretized curvature values, and computing a second distribution of the maximum curvature values over the whole mesh by counting the number of occurrences of discretized curvature values; and wherein the subsequent steps of the method are performed for the first and second distributions;

applying a Gaussian kernel is to the resulting distribution;

for each computed region, applying a region growing, the grow being guided by a distance between faces, the distance being weighted by the curvature values to aggregate all faces not already assigned to a computed region;

the region growing comprises assigning a same first score to the faces of a first set of faces, the first set of faces comprising the faces belonging to none of the computed regions, and assigning a same second score of zero for each face belonging to one of the computed regions, the first score being larger than the second score; testing each face of the first set by: for each adjacent regions of the face, computing a third score being based on a distance between the face and the adjacent region and on a difference in principal curvature values between the face and the adjacent region; if the third score is smaller than the first score: setting the first score to the third score and recording to which region the third score corresponds; adding the neighbors of the tested face to the first set of faces if the neighbors do not belong to the first set of faces; if the third score is larger than the first score, removing the tested face from the first set; regrouping the tested faces initially in the first set with the region associated with the best third score they have;

the testing stops when all the faces of the second set have been tested;

after computing regions of the mesh, computing intersection loops between the computed regions;

after the computation of intersection loops, for each intersection loop: collecting an ordered list of regions composing this intersection loop, and concavity, convexity and position information for each edge of the said intersection loop;

the identifying parameters of the primitive by using a surface for the region comprises estimating parameters of the detected primitive with a least optimization of those parameters.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the disclosure will now be described, by way of non-limiting example, and in reference to the accompanying drawings, where:

FIG. 13 shows a screenshot of regions of uniform curvature of the mesh of FIG. 5;
FIGS. 14a and 14b are screenshots illustrating before and after region growing process;
FIGS. 15a and 15b are screenshots illustrating before and after region growing process;
FIG. 16 is an example of a principal curvature value distribution of a plane entity;
FIG. 17 is an example of a principal curvature value distribution of a cylinder entity.

DETAILED DESCRIPTION OF THE INVENTION

Figure 1:
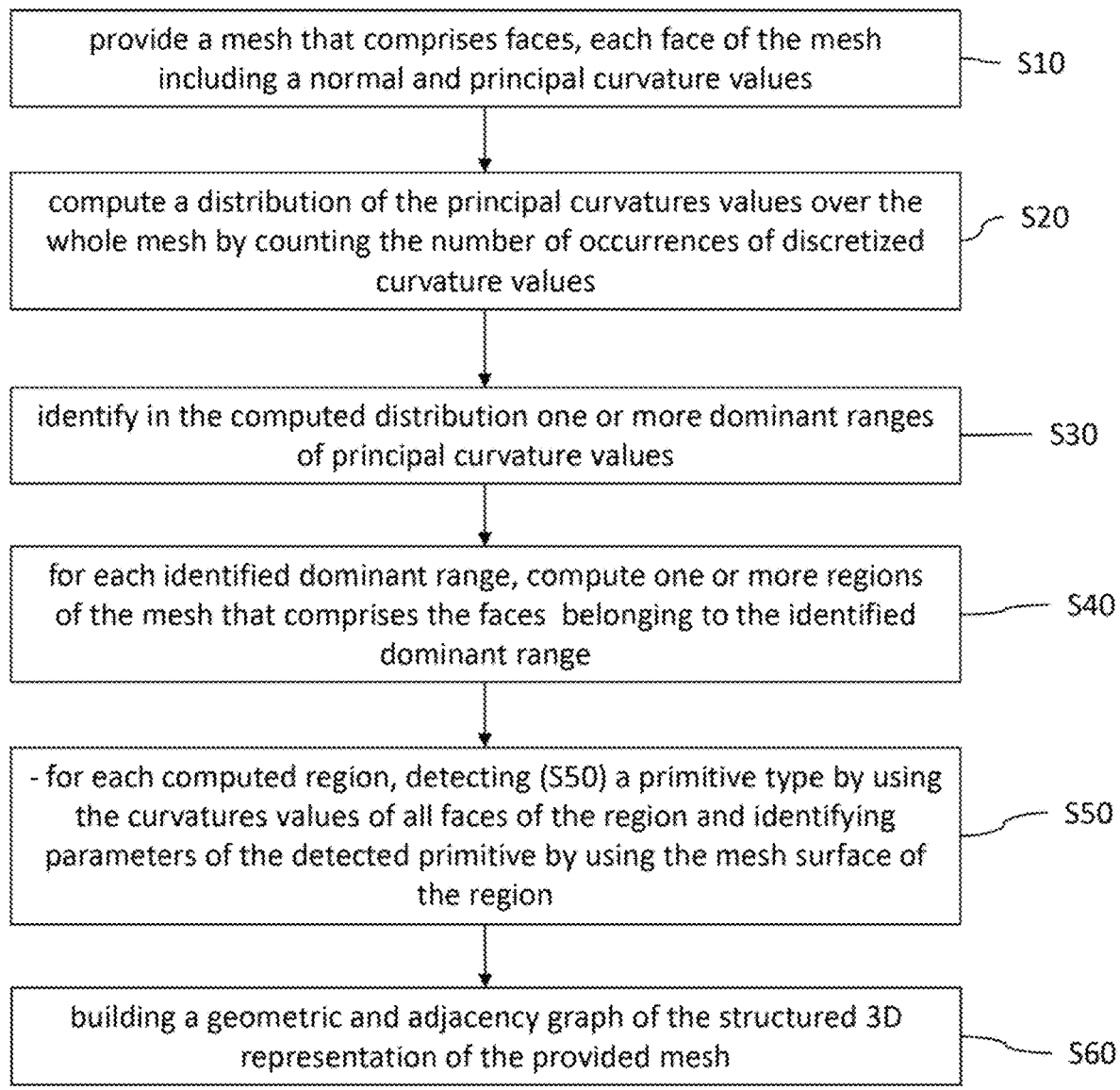
FIG. 1 shows a flowchart of an example of the method.

With reference to the flowchart of FIG. 1, it is proposed a computer-implemented method for generating a structured three-dimensional (3D) model from a mesh. The method comprises providing (S10) a mesh that comprises faces. A mesh comprises vertices, edges, and faces that use polygonal representation, including triangles and quadrilaterals, to define a 3D shape. Each face of the provided mesh includes a normal and principal curvature values. The method also comprises computing (20) a distribution of principal curvature values of the mesh. The distribution is made over the whole mesh. The distribution is computed by counting the number of occurrences of discretized curvature values. The method further comprises identifying (S30) in the computed distribution one or more dominant ranges of principal curvature values. The method further comprises computing (S40), for each identified dominant range, one or more regions of the mesh that comprises faces belonging to the identified dominant range. Then method also comprises, detecting (S50), for each computed region, a primitive type by using the curvatures values of all faces of the region and computing parameters of the detected primitive by using the mesh surface of the region.

Such a method improves generation of a structured three-dimensional (3D) model from a mesh.

Notably, the method is more robust compared to the known solutions of B-Rep constructions. These B-Rep construction solutions are often fragile, i.e. they either entirely complete or fail to produce a valid structured representation of a solid, depending on the quality of the mesh that is provided. In the present method, the construction of the regions is based on the dominant ranges of principal curvature values. The consequence is that the present method does not relies on the edges identified in the mesh for finding out primitives, but rather discard the faces forming the edges of the primitive and keeps triangles that are likely to belong to a surface of the primitive. This makes the identification of the primitives less sensitive to the quality of the mesh as more faces of the mesh are generally involved in the surface of a primitive compared to faces of the mesh that constitute the edge.

Figure 3:
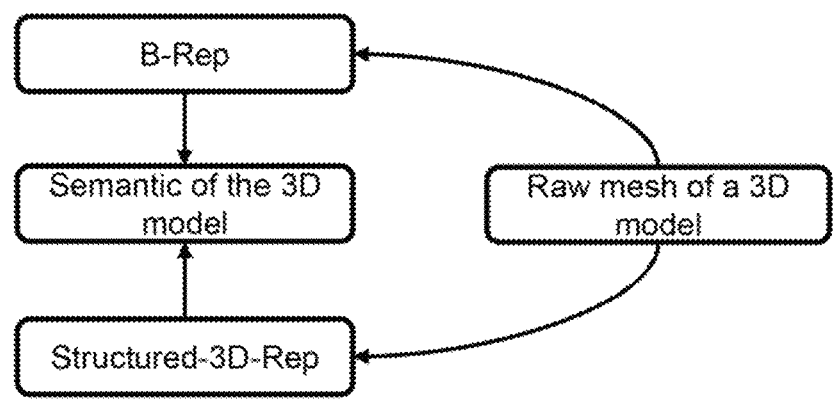
FIG. 3 shows an example of a comparison between the method and the prior art.

In addition, the present method allows not fully succeeding in identifying all faces and adjacencies to generate a structured 3D model representation. Even if the structured 3D model might not contain all the faces and adjacency information that could be expected, even if it does not cover the whole mesh, it can contain additional information (e.g. convexity, positions) that allows performance of a reconstruction of a feature tree. This structure 3D model is a geometry and adjacency graph with all this information. Generating this geometry and adjacency graph with the present method is more robust than methods for rebuilding a valid and complete B-Rep from a mesh. FIG. 3 illustrates differences between the known method and the present method.

Furthermore, using only a dominant range of curvature values along with the computation of one or more regions of the mesh allows obtaining of an effect similar to defeaturing operators right from the first iterations of the process. Solutions of the prior art perform on the contrary a number of iterations dependent on the geometry complexity of the mesh being analyzed. Hence, the present method decreases consumption of the resources (for instance CPU, memory) of the system that computes and generates the structured 3D model.

Further improvements will be apparent in the following description.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the step of providing the mesh may be the result of a user selection of a mesh stored, e.g. on a database.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By CAD system, it is meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A mesh (and by extension the generated structured 3D model) may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). The mesh may also represent the geometry of product to be manufactured in the real world subsequent to a scanning of the product, e.g. the mesh comes from metrology precision scanning, subsequent mesh design operations, e.g. performed with a software that allows mesh editing. The mesh may also represent the geometry of a product to be manufactured in the real world subsequent to its retrieval from a machine tool data file, a 3D printer file, metrology devices data files . . . . The mesh may also represent the geometry of product to be manufactured in the real world subsequent to point clouds that have been processed by dedicated meshing software or that have been authored in Digital Content Creation tool that can produce assets for 3D visualization.

A mesh (and by extension the generated structured 3D model) may represent products in various and unlimited industrial fields, including: aerospace, architecture, construction, consumer goods, high-tech devices, industrial equipment, transportation, marine, and/or offshore oil/gas production or transportation. The generated structured 3D model may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round) and/or standard surfacing features (e.g. sweep, blend, loft, fill, deform, and/or smoothing). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus, allowing decision on management or required investment. CAM is a subsequent process after a CAD process and potential CAE process. Such CAM solutions are provided by Dassault Systèmes under the trademark DELMIA®.

By CAE solution. It is additionally meant any solution, software of hardware, adapted for the analysis of the physical behavior of a modeled object A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed a plurality component from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 2:
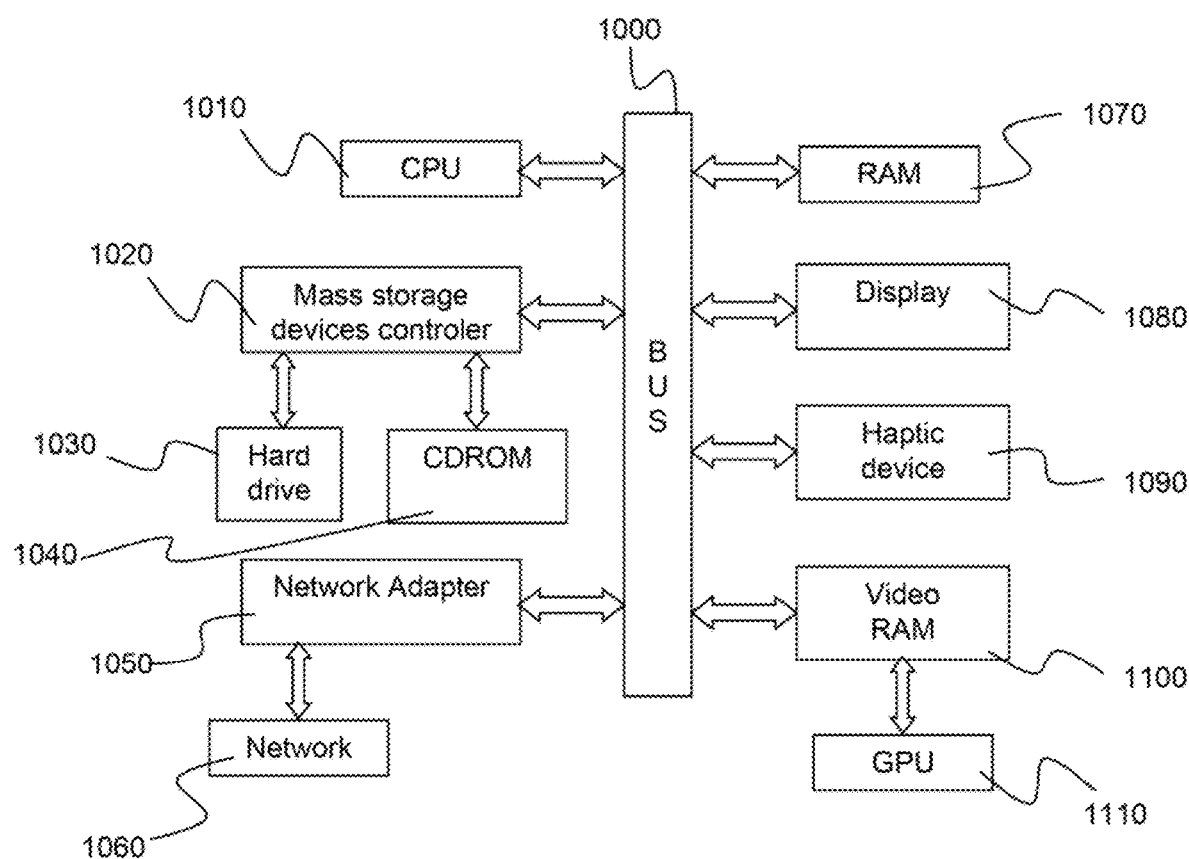
FIG. 2 shows an example of the system.

FIG. 2 shows an example of a system for performing the method. The system of the example comprises a central processing unit (CPU) 1010 communicatively coupled to a memory, e.g. a random-access memory (RAM) 1070. In this example, the CPU and the memory communicate through an internal communication BUS 1000. The client computer may further comprise further a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in 0.30 instructions for performing the method.

"Generating a structured 3D model from a mesh" is at least part of a process of elaborating a 3D modeled object. Thus, the method may comprise creating the mesh from scratch. The method may be included in a manufacturing process, which may comprise, after performing the method, producing a new 3D modeled object from the generated structured 3D model. A new 3D modeled object represents a physical product. In any case, the mesh in input of the method and the generated structured 3D model may represent a manufacturing object that is a product, such as a part, or an assembly of parts. Because the method allows the design of the modeled object from a raw mesh, the method also improves the manufacturing of a product and thus increases productivity of the manufacturing process.

Referring back to FIG. 1, a mesh that comprises faces is provided (S10). A mesh comprises vertices, edges, and faces that use polygonal representation, including triangles and quadrilaterals, to define a 3D shape or at least a portion of a 3D shape. The 3D shape represents a solid object. The 3D shape represents a product in various and unlimited industrial fields, including, but not limited to, aerospace, architecture, construction, consumer goods, high-tech devices, industrial equipment, transportation, marine, and/or offshore oil/gas production or transportation.

Each face of the provided mesh comprises a normal. The normal of a face is a direction that is perpendicular to the face, as known in the art. In examples, the normal may be a vertex normal.

Each face of the provided mesh comprises principal curvature values. The principal curvature values measure how the surface bends by different amounts in different directions at that point. The maximum and minimum curvature values for the face are called the principal curvature values of the face.

Figure 6:
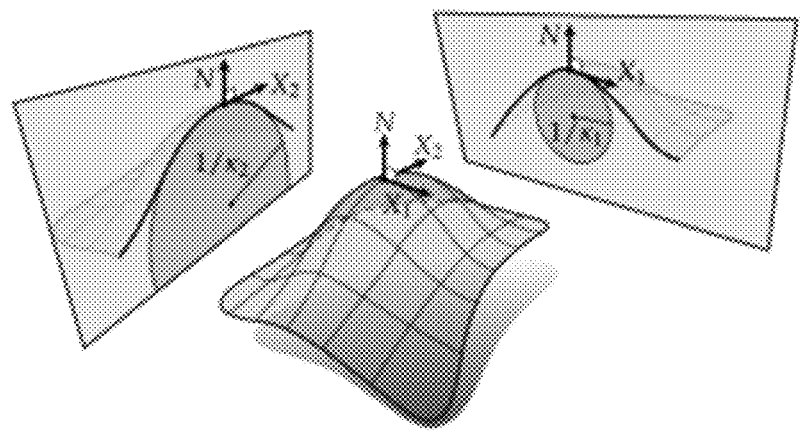
FIG. 6 shows an example of a representation of curvature.

FIG. 6 (extracted from "Discrete differential geometry: an applied introduction", K. Crane) is a generalized representation of a curvature at a given point of a surface that is located at the origin of the reference (N, $X_1$, $X_2$). Axis N represents the normal to the surface at the said given point, $X_1$ and $X_2$ are the directions for which the minimum and maximum curvature values are computed in this example.

In examples, the provided mesh may be a raw mesh when the polygonal representations are not of similar dimensions and well equilibrated. For instance, the raw mesh may comprise skinny triangles. More generally, the present method behaves correctly and produces useful results (even if sometime partial) on meshes that are valid representations of 3D solids, e.g. the 3D mesh may form a closed and orentable manifold surface with no auto Intersections. The method also produces interesting results with meshes that are not closed.

Figure 4:
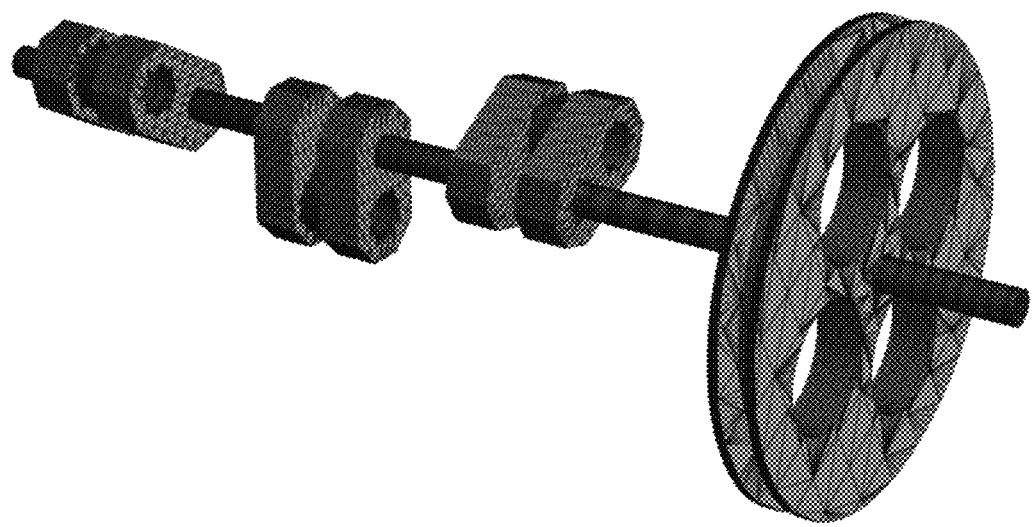
FIG. 4 shows a screenshot of an example of a raw mesh.

FIG. 4 illustrates an example of a raw mesh with triangles as polygonal representations. This triangular raw mesh is not particularly clean as it has T-Junctions; that is, the mesh comprises spots where two polygons meet along the edge of another polygon. In addition, no information regarding the normals and the principal curvature values is available.

Figure 5:
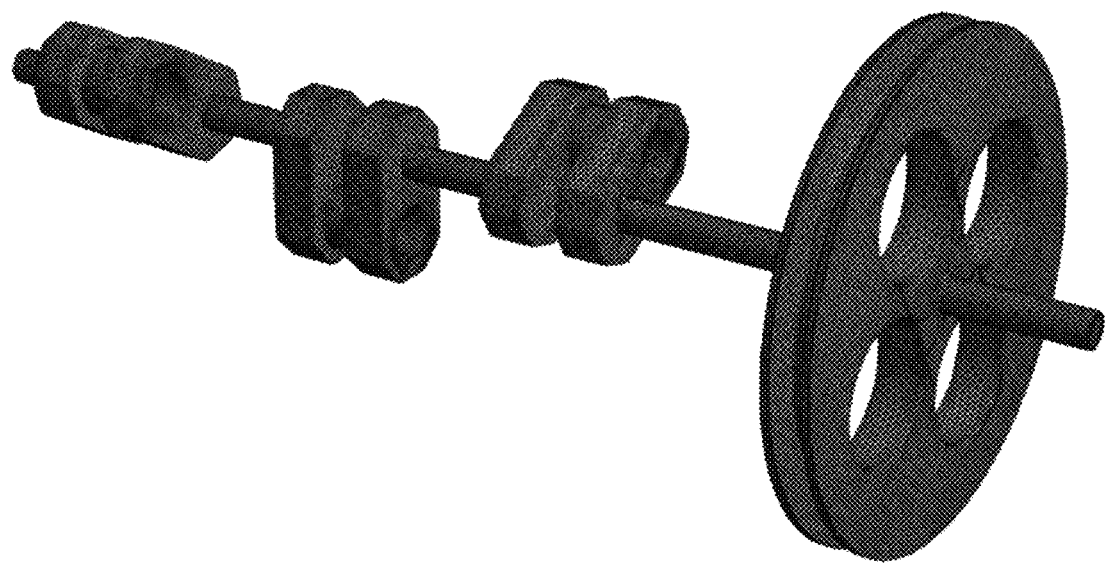
FIG. 5 shows a screenshot of an example of the remeshing of the raw mesh of FIG. 4.

In examples, the method may further comprise remeshing the provided mesh. This allows to improve the quality of the mesh, namely the faces are of similar dimensions and well equilibrated, e.g. there are no skinny triangles. There are a lot of available methods, e.g. variational approaches may tend to produce well behaved meshes for the present method. FIG. 5 shows an example of a resulting mesh after a Ramesh operation carried out on the raw mesh of FIG. 4.

In addition, remeshing a raw mesh improves the evaluation of the principal curvature values. Indeed, curvature can be evaluated on discrete 3D representations like triangular meshes for example using procedure like cotangent one, and most of these procedures tend to provide better results on meshes in which the faces (typically triangles) are similar and well equilibrated.

In examples, an evaluation of the principal curvature values on discrete geometries (the faces of the remeshed mesh) is performed with any known method. Normals may be evaluated at the same time, or before or after the evaluation of the principal curvature values.

Figure 7:
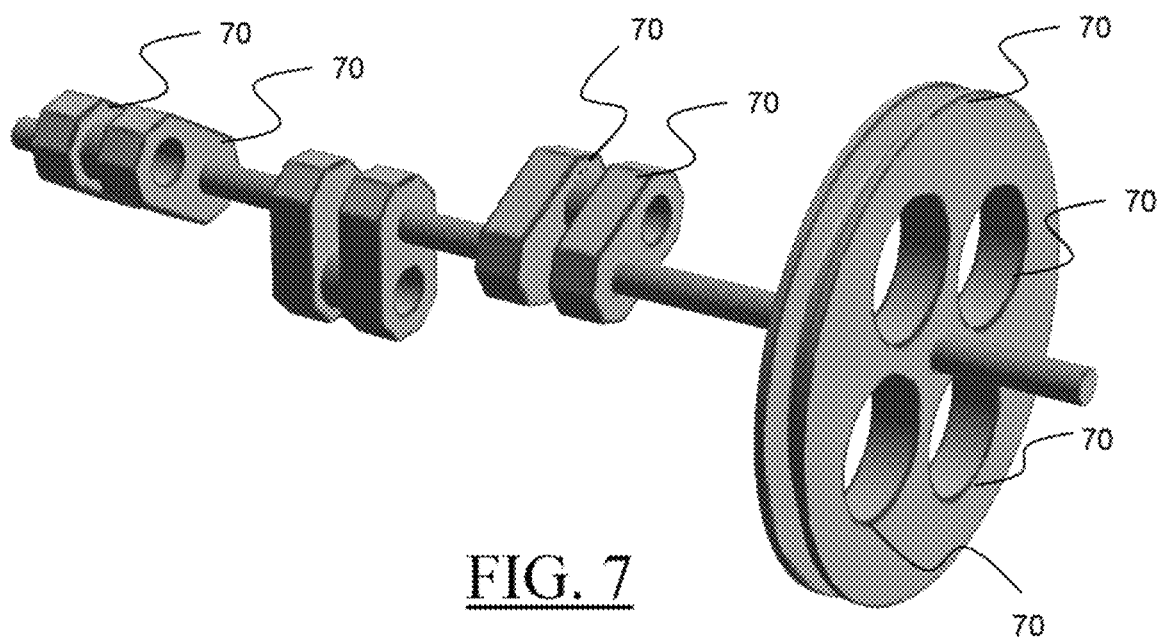
FIGS. 7 and 8 show screenshots of principal curvatures of the mesh of FIG. 5.
Figure 8:
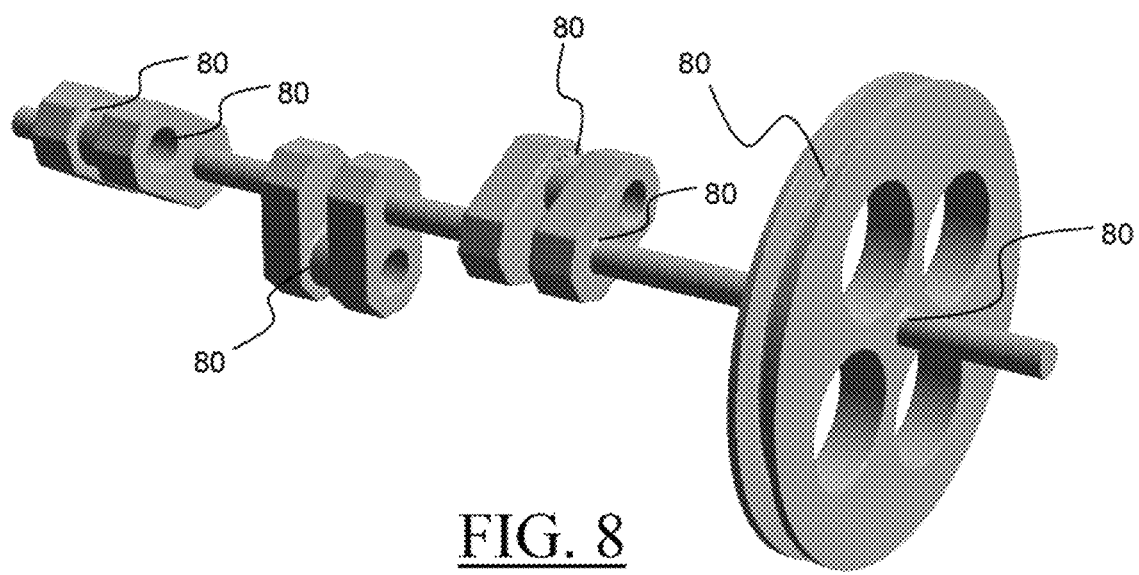

FIG. 7 and FIG. 8 shows maximum, respectively minimum, curvature values 70, respectively 80, identified (computed) for the mesh of FIG. 5.

Back to FIG. 1, a distribution of the principal curvatures values over the whole mesh is computed (S20). The distribution is computed by discretizing the principal curvature values and the distributions are made by counting the number of occurrences of specific values. A link between each curvature value of the distribution and its corresponding face is kept—the corresponding face is the face on which the said each curvature value has been obtained (or computed).

Each entry in the distribution contains the count of the occurrences of principal curvature values within an interval of values of the principal curvature values. An interval of principal curvature values is also referred to as a range of principal curvature values. It is to be understood that all intervals of values (that is, all the ranges) comprise all the principal curvature values of the faces of the mesh. In examples, a Gaussian may be applied on the distributions for noise reduction. In practice and for the sake of visualizing the histograms of the distributions only (for instance on FIGS. 9 and 10), the intervals of principal curvature values may be identical; said otherwise, the discretization of the values and the range of the values over which the distribution extends are forced to be the same for the two principal curvatures distributions.

In an example, the number of ranges is fixed for the discretization and may be chosen by the user. Principal curvatures values are accumulated over the whole mesh.

In another example, the number of ranges may be adapted according to a maximum number of occurrences for each range: indeed, the number of occurrence counts may vary a lot from one mesh to another. In the end these exact counts are important relative to others as they serve to identify interesting ranges of principal curvature values, but one isolated count does not have much importance. The number of occurrences in a range may be divided by the number of faces of the mesh, thus the number of occurrences for each range can be interpreted as a percentage.

The computing of the distribution is made as known in the art.

In examples, the computation of the distribution may further comprise a Gaussian kernel is applied to the resulting distributions to get rid of some of the fluctuations in values.

Figure 9:
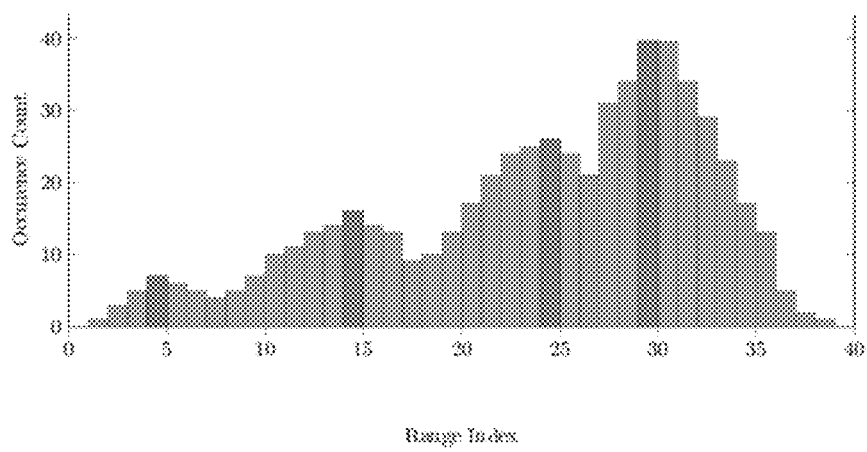
FIGS. 9 and 10 show examples of principal curvature value distributions of the mesh of FIG. 5.

FIG. 9 is an illustration of an example of a distribution of the principal curvature values of the faces of a mesh. In this example, the distribution is represented with a histogram. Here, the principal curvature values are between −2.0 and 2.0 and the distribution comprises 40 ranges of values. Signed values of the principal curvature values are taken for computing the distribution. The principal curvature values might be discretized with more ranges in the histogram of FIG. 9, for example 100 ranges. In this example, the curvature values have been forced to be discretized in 40 ranges.

Referring back to FIG. 1, S20, the principal curvature value of each face may comprise a minimum curvature value and a maximum curvature value. Hence, instead of computing a distribution with absolute values as discussed in reference to FIG. 9, the computation may comprise the computing of two distributions, respectively a first distribution of the minimum curvature values over the whole mesh by counting the number of occurrences of discretized curvature values and a second distribution of the maximum curvature values by classifying the maximum curvature values by their number of occurrences over the whole mesh by counting the number of occurrences of discretized curvature values.

It is to be understood that the examples discussed in reference to the general case where the distribution is computed by counting the number of occurrences of discretized curvature values apply to the examples where the first and second distributions are computed.

Figure 10:
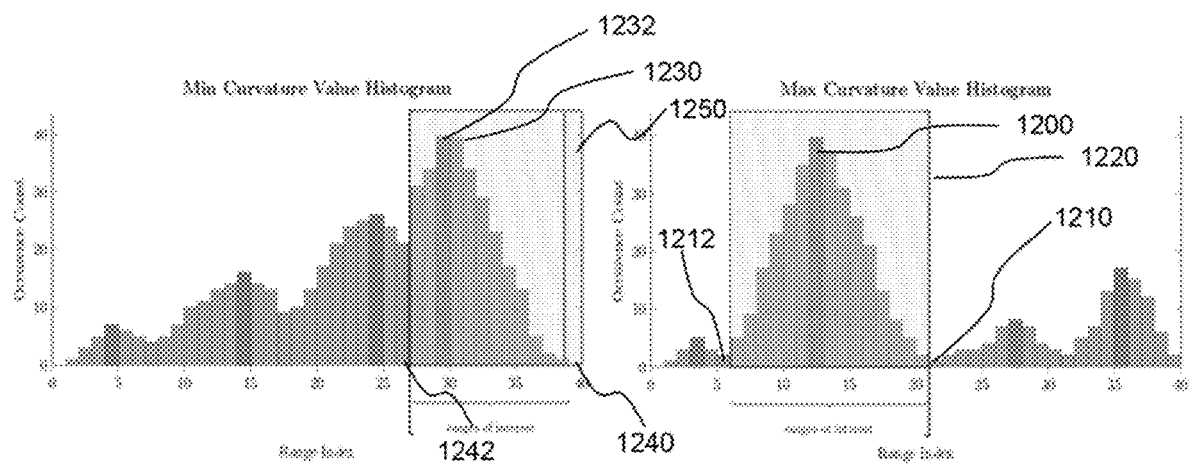

FIG. 10 is an illustration of an example of two computed distributions for a same mesh; the distribution on the left has been computed for the minimal curvature values of the faces of the mesh and the distribution on the right has been computed for the maximum curvature values of the faces of the mesh.

Back to FIG. 1, at S30, the method further comprises identifying in the computed distribution one or more dominant ranges of principal curvature values. A dominant range is a range representing a number of occurrences that is larger than those of other ranges. A dominant range may be dominant over the complete distribution. Alternatively, a dominant range may be a locally dominant; it is referred to as local dominant range. A local dominant range is a range with a number of occurrences that is larger than those of ranges among a given number of successive ranges on the distribution.

In the examples where two distributions are computed, a dominant range is identified on each of the two distributions.

In examples, the identification of a dominant range of principal curvature values may be performed upon determination of a local maximum of the distribution that is between two successive local minima of the distribution. The "local maximum" and the "local minimum" are local extrema in accordance with the mathematical definition. "Successive local minima" means that no further local minimum is between the two local minima. The ranges that are comprised between the two local minima, thus including the local maximum, form the dominant range. Therefore, the faces with discretized curvature values comprised between the two successive local minima belong to the dominant range, and the faces that belong to the two successive local minima do not belong the dominant range. The faces that belong to the two successive local minima are the most likely to belong or to be close to the edges of the primitive, while the faces that belong to the identified dominant range are the most likely to form a primitive.

Referring now to FIG. 10, an example of the identification of a dominant range of principal curvature values from a local maximum and two successive local minima is represented. The ranges represented in dark grey are local maxima. The right part of the figure, which corresponds to the distribution of the maximum curvature values of the faces of the mesh, is now discussed. The local maximum 1200 has been identified. This local maximum is surrounded by two local minima 1210, 1212 that are successive local minima as no further local minimum is comprised in the ranges between 1210 and 1212. The rectangular shape 1220 covers the ranges that form the identified dominant range. It is to be understood that three further dominant range can be identified on the right part of FIG. 10. The left part of the figure, which correspond to the distribution of the minimum curvature values of the faces of the mesh, is now discussed. Two successive local maxima 1230, 1332 have been identified. They are surrounded by two local minimum 1240, 1242 that are successive local minima. Interestingly, the range 1240 is an empty one as no faces has a minimal curvature value that is covered by this range. This empty range 1240 is a local minimum and in addition it is the last range of the distribution; for these reasons is represented as belonging to the dominant range 1250. It is to be understood that if the range 1240 would be located between two local maxima, it would not be represented as belonging to an identified dominant range.

In examples, the identification of the one or more dominant ranges on the distribution is performed without iterating, that is, all the dominant ranges are identified in the distribution in a row. The computation costs for the identification of the dominant ranges are thus low. In examples there are two distributions, the identification is similarly performed on both distributions in a row.

In examples, the identification of the one or more dominant ranges on the distribution performed upon determination of a local maximum of the distribution that is between two successive local minima of the distribution is repeated while the number of occurrences for a local maximum is equal and/or above a predetermined value, e.g. the predetermined value may be a number of occurrences that is equal to 1. The number of primitives' types (for example, plane, cylinder, ruled surfaces . . . ) being limited, the number of iterations does not need to exceed the number of primitives' type. Before each repetition, the faces previously identified as belonging to a dominant range are discarded, and the distribution is recomputed. Thus, the former identified two successive local minima of the distribution belong to the new distribution. Alternatively, all the dominant range may be identified in a row. Interestingly, the former local minima may contribute to a newly identified dominant range; this means that the faces that were previously considered as having the potential to belong or to be close to the edges of a primitive, may in a next identification of a new dominant range be part of a primitive. The new distribution may comprise a same number of ranges. The identification of each dominant range allows to derive an interesting range of values in which individual faces are part of a surface that might be associated with an interesting primitive. In fact, the identified range of dominant values allows to decide if each face is a face of a dominant primitive type or not. Clearly the process may be repeated on the remaining facets that have been discarded during the first pass (that is, those that do not belong to the previously identified dominant range(s)), leading to other distributions of values, identification of faces associated with another primitive types and so on. In examples there are two distributions (one for minimum curvatures values and one for maximum curvature values), this iterative identification is similarly performed on both distributions, e.g. concomitantly.

Thus, the determination of the dominant ranges allows to identify a first set of faces of the mesh that are likely to belong or to be close to the edges of a surface of primitive, and a second set of faces (a set of faces for each dominant range) where each set will form a region of a dominant primitive type.

It is worth noting that the method according to the embodiments has a different approach from the known prior art, such as Bénière et al. previously discussed. In the known prior art, sub meshes are iteratively processed until a point is reached where it is possible to identified or know how to deal with each part. On the contrary, the method can be stopped early when achieving something similar to defeaturing by not considering the areas outside of the dominant ranges associated with primitive types. Defeaturing means removing non-essential details from a CAD model, as is known in the art.

Figure 11:
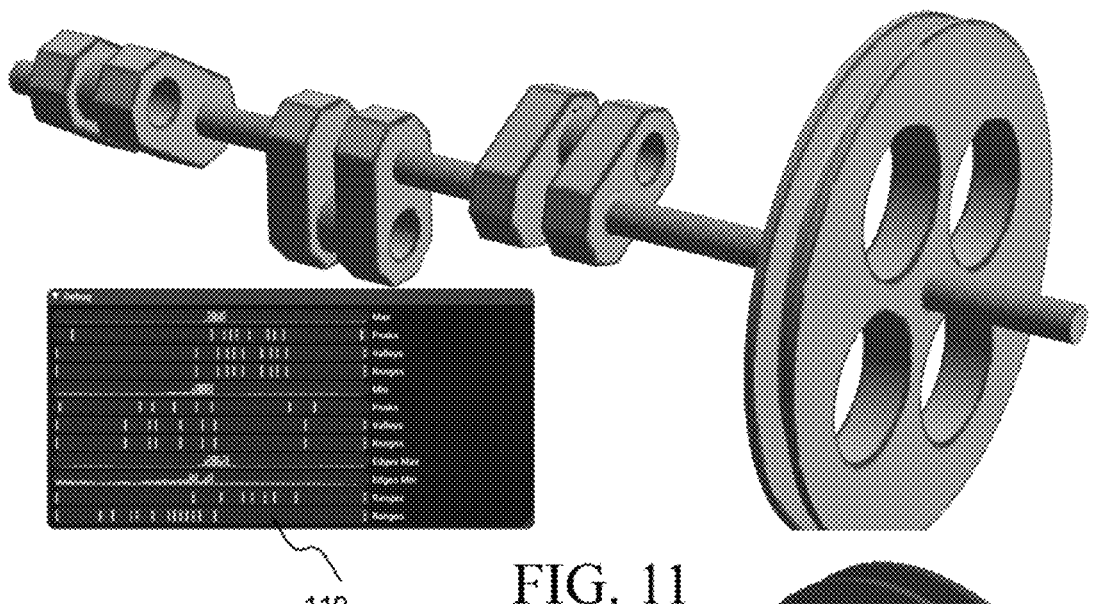
FIG. 11 shows a screenshot of curvature value range of interest of the mesh of FIG. 5.

FIG. 11 is a screenshot that shows the maximum curvatures of the mesh from FIG. 5 along with histograms—in the debug window 110—showing the distributions of min and max curvature values along with the ranges of values that have been built.

Back to FIG. 1, one or more regions of the mesh are computed (S40) for each identified dominant range. Each computed region thus comprises faces belonging to the corresponding identified dominant range. A region of the mesh is thus a set faces of the provided mesh.

Figure 12:
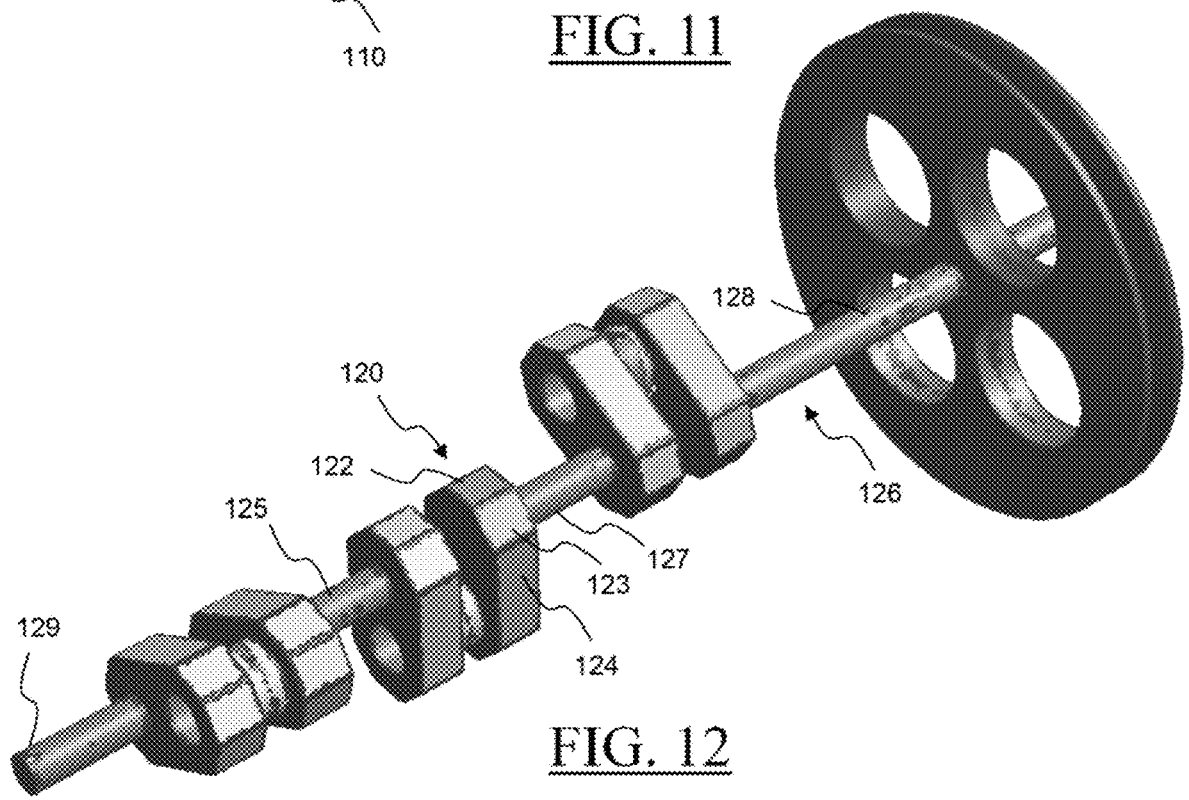
FIG. 12 shows a screenshot of regions of uniform curvature of the mesh of FIG. 5.

Thus, once one or more interesting range of curvature values have been identified, the faces are classified based on where they are part of these dominant ranges at one iteration of the method. FIG. 12 is a screenshot of the regions of uniform curvatures that have been obtained as a result S40 on the mesh of FIG. 5. The regions 122, 123, 124 are likely to match with a specific primitive surface type 120. The regions 125, 127, 128 and 129 match with another primitive surface type (here a cylinder). These regions are all part of a primitive surface of a rod 126 but at this step of the method they are seen as separated regions. One also notices that most of the regions shown on FIG. 12 do not have a clear intersection with their neighbor, for instance between 122-123 and 123-124.

In examples, a region growing is applied on each computed region to aggregate the faces not already assigned to one of the computed regions. The faces not already assigned to a computed region are those previously not attributed to one of the identified dominant ranges. The region growing can be applied successively on each region, or simultaneously on two or more or on all computed regions. The region growing improves the quality of the intersections between regions of the mesh: indeed, the region growing aims at aggregating all faces not already assigned to a computed region. These faces are typically those that were not identified as belonging to a dominant region. The region growing contributes to creating regions that touch each other.

In examples, the region growing (that is applied on each computed region) is guided by a distance between faces. The distance to be considered is the distance between a face of the region and a non-assigned face. The distance may be computed using any known method, e.g. Euclidian distance. A number of jumps from a triangle of the region to the non-assigned triangle may be used as an estimate of the distance, e.g. the distance on the surface. It is to be noted that when the faces of the mesh are well equilibrated (e.g. thanks to a remeshing), the number of jumps is an approximation (even very coarse) of a geodesic distance. Hence, geodesic distance or something similar may be used and is better than Euclidian distance between face centers for example.

In examples, the distance of region growing is weighted (one could also say modulated) by differences between the curvature values. Using the differences between curvature values for guiding the grow allows to maximize the number of relevant intersections for the region being grown with other regions. In addition, guiding the grow with curvatures values allows to grow faster in areas that are more likely to be part of a same primitive surface.

In examples, the distance value is linearly weighted by a constant and the differences between the curvature values. This improves the efficiency of the region growing.

In these examples of the region growing, a score is computed for the non-assigned face. Hence, and according to these examples, the score may be computed based one the distance between faces or based on the distance that is weighted by differences between the curvature values or based on the distance that is linearly weighted by a constant and the differences between the curvature values. When reaching a non-assigned face that might have already been associated with another primitive the new score for the current expansion is compared to the recorded score and the best score win. If it is the previous score that wins the expansion through this facet stops. If on the contrary the new score wins then it means that all the facets touching this facet (except the one, we are coming from for the new score) might have a better score than they had before and thus we keep spreading the same process to these neighbors . . . and so on. If an already associated face gets associated with a new region, all the neighbors of this already associated face are evaluated again, except the associated face. This mechanism has some similarities with a Dijkstra or A* except that the mechanism does not try to reach a specific objective and is not guided by a heuristic toward that objective.

A detailed example of a growing region algorithm is now discussed. The region growing is guided by the distance that is linearly weighted by a constant and the differences between the curvature values.

Although the principle is the one described above, at the implementation level the algorithm works in a way that is the mirror of that to simplify the implementation. Faces check what are the values coming from the neighbors.

The process is initiated as follow. One assigns a same first score (a same arbitrary large score) to the faces of a first set of faces, the first set of faces comprising the faces belonging to none of the computed regions. In addition, one assigns a same second score of zero for each face belonging to one of the computed regions. The first score is larger than the second score. Said otherwise, to initiate the process all triangles in a region are initialized with a zero cost and the region of which they are part of is recorded as the region giving them this zero score. All faces (e.g. triangles) that are not part of a region are given an infinitely high score and a 'no region' region is recorded on these faces as the region giving that score.

Then each face of the first set (the faces that are not yet part of a region and that must be processed) are tested. That is, all faces not assigned to a region are put in a queue of faces to be processed.

For each face to be processed (or face to be tested), neighbors of the faces are checked to see the scores that could be get through them. The neighbor of a face is face sharing an edge. Hence, for each adjacent regions of the face, a third score is computed based on a distance between the face and the adjacent region and on a difference in principal curvature values between the face and the adjacent region.

If there is no better score (that is, if the third score is larger than the first score), the process stops for the tested face and the tested face is put in a list of already processed faces. The region to which the score corresponds is also recorded. Alternatively, the region to which the score correspond will be recorded when the best score among the computed scores for the tested face has be determined.

If the score is equal to the score already assigned, then the process stops. The tested face is put in a list of already processed faces. The region to which the score corresponds is also recorded. Alternatively, the region to which the score correspond will be recorded when the best score among the computed scores for the tested face has be determined.

If there is a better score (that is, if the third score is smaller than the current score), the tested face is removed from the first set (the faces that are not yet part of a region and that must be processed), the process records the better score (that is, the process records the better score which becomes the new current face score) along with the region respective to that score for the tested face, and it puts back all neighbor faces of the tested face (except the face giving the new score) in the queue of faces to be processed. If eventually a neighbor face is the list of already processed faces, then it is removed from the list of already processed faces.

And when the list of faces to be processed is empty, the tested faces initially in the first set are regrouped with the region associated with the best third score they have.

This process will converge like a Dijkstra and ensure that each face that was not assigned to a region will record its best 'proximity' score and the associated region.

The region growing can be summarized as follows.
Initialize an arbitrarily large score for each 'edge' triangles (not assigned to a region) and specify that it is not associated with any region at this point.
Initialize all non 'edge' triangles already associated with a primitive with a score of zero and associate them with the primitive they are already part of.
Put all 'edge' triangles in a collection of triangles to be processed
While collection of triangles to be processed is not empty:
  Get a triangle from that collection
  If triangle is in already processed list:
  Continue with next triangle in the collection of triangles to be processed
  For each neighbor of that triangle:
  Compute that triangle potentially new score as if we were coming from that neighbor using the following formula the new score is the value that will be checked against the current best score of the face):
new_score=neighbor_score+1+constant_curvature_factor* (A+B)
where
constant_curvature_factor is a constant curvature factor;
A is the absolute value of the difference between the maximum curvature value of the selected face and the maximum curvature value of the face of the adjacent region;
B is the absolute value of the difference between the minimum curvature value of the selected face and the minimum curvature value of the face of the adjacent region.
  If that new score is lower than that triangle current score:
  Set the new score
    Associate that triangle with the shape the neighbor is associated with
  Record the neighbor that we have used
  If that triangle score value has been improved (by going through a specific neighbor):
  Put back all that triangle neighbors, except the specific one through which we have an improved score, in the list of triangles to be processed and remove them from the already processed list
  Add that triangle to the already processed list.

One reminds that the algorithm is applied after the identification of one or more dominant ranges of principal curvatures values (S30). The algorithm has thus in inputs one or more second sets of faces (the set of faces for each dominant range) where each set will form a region of a dominant primitive type, and the first set of faces that comprises faces that are likely to belong or to be close to the edges of a region.

When the second set of faces is empty, that is when all the faces have been associated with one of the computed regions of the mesh, the above-described test stops. FIG. 13 represents the mesh of FIG. 12 obtained after applying the region growing. One can notice that each region has now edges that are defined by interconnected edges of faces; the edges of the regions are thus polylines that delimit the surface of the region.

FIG. 14a (respectively FIG. 15a) is a screenshot of a mesh with regions before the growing region. FIG. 14b (respectively FIG. 15b) is a screenshot of the mesh of FIG. 14a (respectively FIG. 15b) after applying the region growing.

Referring back to FIG. 1, a primitive type is detected for each computed region (S50). A primitive is a building block from which other shapes can be built. Primitives are commonly used in 3D modeling for building a 3D modeled object. For instance, 2D polygon (e.g. a square, a rectangle) is a primitive that can be extruded in order to form a 3D volume (e.g. a square pad or a rectangular pad). A primitive can be, but is not limited to, a plane, a cylinder, a sphere, a pyramid, a cone, a quadric, a ruled surface, a torus . . . . A set of primitives allows describing an industrial product, e.g. the one represented by the mesh.

The detection of a primitive's type (one could also say the computation) relies on the curvature values of the faces of the region. The detection of a primitive's type by using the curvature values of the faces of the region is performed as known in the art. FIG. 16 illustrates the distribution of principle curvature values of the faces of a region that is a primitive of the type plane. FIG. 17 illustrates the distribution of principle curvature values of the faces of a region that is a primitive of the type cylinder. The distributions of FIGS. 16 and 17 may be templates of a respective type of primitive, and a comparison of template with the distribution of a region allows identifying the primitive of the region.

For each detected primitive, parameters of the detected primitives are computed based on the primitive type using the surface of the region (aka the triangles of the mesh associated with that region) and a least square optimization algorithm on the parameters may be applied. The parameters of a primitive determine the characteristics of the primitive from which the primitive can be instantiated. For instances, as known in the art:
  the parameters of a primitive plane are the normal to the plane and a point lying on the plane;
  the parameters of a primitive sphere are the center and the radius;
  the parameters of a primitive cylinder are the direction of the axis, the height of the cylinder, the center and the radius of the bottom circle;
  the parameters of a primitive cone are the axis direction, the height of the cone, the center and the radius of the cone base;
  the parameters of a primitive torus are the direction vector, the center, the radius for the great circle and the radius for the small circle.

The detection of the parameters of a primitive is performed as known in the art. The parameters are computed using the surface of the region, that is, directly form the mesh. In examples, the identification of the parameters is performed by estimating the parameters with a least square optimization. The values of the parameters are optimized so that the exact surface that can be instantiated from them sticks at best to the portion of the mesh that is to be represented by this surface. Each parameter comprises one or more parameters values that are used for instantiating the primitive. For the sake of simplicity, the terms "parameter" and "parameters values" are synonyms.

In examples, and after the computing of the regions of the mesh, intersection loops between the regions are computed using the adjacencies of the triangles of the mesh. An intersection between two regions is also referred to as surface-to-surface intersection (SSI) where the surfaces are those of the two regions. When two surfaces intersect, the result may be a set of isolated points, a set of curves, or any combination of these cases.

The intersection loops between the regions form boundaries of the surfaces of the regions. The term "loop" means that an intersection forms a closed curve within itself or that two or more intersections form a closed curve within itself. Thus, an intersection loop for a region may result of the intersection of the region with one other regions, e.g. a plane is intersected by a cylinder; or an intersection loop for a region may result of the intersection of the region with two or more regions, e.g. a face of a cube intersects four faces. The regions being a set of faces of the mesh, an intersection between two regions comprises interconnected edges of faces (a connected sequence of edges) that belong both to the regions forming an intersection. Hence, an intersection is a polyline of common edges of faces of two regions, and therefore an intersection loop is also a polyline comprising common edges of faces of two or more regions that delimit the surface of the region.

In examples, the computation of intersection loops is performed for each region upon identification of all the intersection of the region with the other regions. Thus, the intersection loops are created from all the intersections of the region with the other regions. When the computation of the intersection loop is done, a polyline of the edges of faces of the region is built, as known in the art.

In examples, after the computation of intersection loops, and for each intersection loop, an ordered list of the regions that belong to the intersection loop is collected. Said otherwise, the regions in contact with a given region are identified and ranked according to a direction of travel on the loop of the said given region. The ordered list of intersections represents an intersection loop of a node of the adjacency and geometry graph. In the event the region comprises two or more intersection loops and thus the node needs to comprise several intersections, they are provided in a list with the first one that contains the others (the choice for cylinders is arbitrary).

In examples, concavity, convexity and position information for each edge of the intersection loop are collected. The computation of the concavity and convexity is performed as known in the art. In an example, once the various regions are touching each other, the outer and inner intersection loops are collected for each region. These are collected respecting the same rotation order evaluated for each triangle using predicates to cope with potential numeric issues that may be caused by floating point arithmetic. Such collection is discussed by Jonathan Richard Shewchuk, "Robust Adaptive Floating-Point Geometric Predicates", in Symposium on Computational Geometry 1996, pages 141-150. While collecting the intersections, concavity and convexity information for each edge of the faces of the region are computed and recorded, and vertices associated with the loop portions are also recorded. Alternatively, the edges forming the intersection loop could be recorded instead of the vertices.

In examples, the concavity, convexity and position of the edges forming the intersection between two regions are collected. This concavity, convexity and position are no more those of each edge, but rather global concavity, convexity and position of a polyline that is created by the edges forming the intersection between two regions are collected. Then these are consolidated to be associated with the intersection so that it is possible to get concavity and convexity for each adjacency/intersection between two regions.

An intersections loop can be an outer intersection loop or an inner intersection loop, as known in the art. Outer and inner intersection loops thus represent the outer and inner boundaries of each node, that is, boundaries of regions of the provided mesh. In an example, for a region that could be flatten and projected to a place, the outer loop would be the one that contains the other loops.

Figure 18:
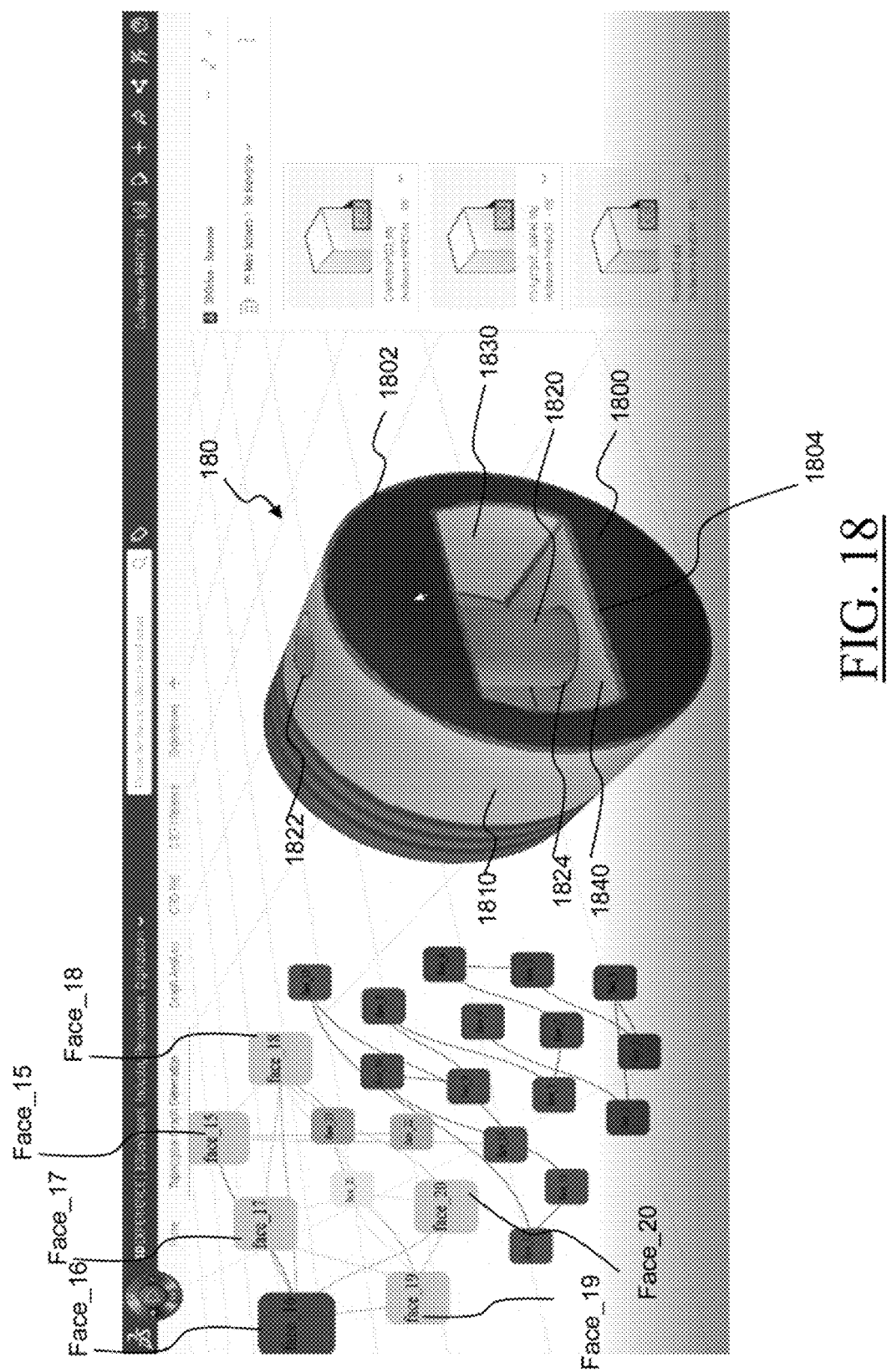
FIG. 18 is a screenshot of a representation of a structured three-dimensional (3D) model from a mesh.

Example of inner and outer intersections loops are represented on the picture (a screenshot) of FIG. 18 for the mesh of an object 180. Several regions (e.g. 1800, 1820, 1810, 1830, 1840 . . . ) have been computed. The region 1800 will be identified as a primitive of the type plane. The region 1800 has contact with the region 18010 that will be identified as a primitive of the type cylinder, and with four regions (only two 1830, 1840 of the four regions can be seen on this figure). An intersection loop 1802 has been computed between the region 1800 and the region 1810. Another intersection loop 1804 has been computed between the region 1800 and the four regions. More precisely, the intersection loop 1804 includes four intersections between the region 1800 and the four regions (e.g. 1830, 1840). The intersection loop 1802 bounds the regions 1800 and is an outer intersection loop. The surface bounds by the intersection loop 1804 is empty (that is, the intersection loop 1804 bounds no faces of the mesh, or no face of the region 1800 are in the delimited surface bounded by the intersection loop 1804), and thus the intersection loop 1804 is an inner intersection loop intersection. The loop 1802 is also an outer intersection loop of the region 1810. The intersection loops 1822 between the region 1810 and the region 1820 (that will be identified as a cylinder primitive) is an inner intersection loop for the region 1810 while it is an outer intersection loop for the region 1810. Similarly, the intersection loops 1824 between the region 1820 and the region 1840 (that will be identified as a primitive of the type plane) is an outer intersection loop for the region 1820 while it is an inner intersection loop for the region 1840. It is to be understood that this choice Is arbitrary for the cylinder as there is an equivalent loop on the other side of the cylinder. Hence, when building the CSG tree several combinations might be tried out.

Collecting oriented loops of intersections, flagging them as inner or outer loop, keeping convexity information per intersection and positions of the intersection edges allow to directly exploit this information, e.g. to generate an exact solid feature tree without building a full exact B-Rep representation. Again, this is especially interesting in cases in which the information provided by the mesh analysis would have failed to rebuild a complete B-Rep. The present is thus more robust. Even if the obtained result may not reflect the full details of the original mesh, it can serve as a base for modeling operations and by extension to any usage one can make of traditional exact CAD models. For example, the user can use part of the generated structured three-dimensional (3D) model from a mesh result as an intermediary step only and edit any element through its parameters.

Back to FIG. 1, a geometric and adjacency graph of the provided mesh is built (S60). The graph provides a structured representation of the outputs of steps S10 to S50, and therefore a representation of a structured 3D model of the mesh generated with these steps. The graph comprises nodes and connections between nodes. Each node of the graph represents one of the computed regions (S40) and is associated with the primitive type identified for this region and the parameters identified for this region. Each connection between two nodes represents an intersection between the respective surfaces of the regions represented by the nodes.

The screenshot of FIG. 18 provides an example of the displaying of the representation of a structured 3D model of the mesh of the object 180 generated as using the outputs of the step S10 to S50. The node "face_16" represents the region 1800 and is associated with primitive type of the regions 1800 (a plane) and the parameters of the primitive. The region 1800 is in contact with five regions, as already discussed. The region 1810 is represented by node "face_15", the four regions (e.g. 1830, 1840 . . . ) are represented by nodes "face_16", "face_17", "face_18", "face_19". Five connections a displayed, one connection between the node "face_16" and the node "face_15" for representing the intersection 1802, and one connection between the between the node "face_16" and the node "face_15" (respectively "face_17", "face_18", "face_19") representing the intersections that form the intersection loop 1804.

In example, further collected information previously collected such as the intersections, the ordered list of regions forming an intersection loop, concavity and convexity information for each edge of the faces and/or the vertices associated with the loop portions are recorded together with the geometric and adjacency graph. "Recorded together" means that this information can be accessed or is associated with a node or a connection. For instance, referring now to FIG. 18, the ordered list of the four regions forming the intersection loop 1804 can be stored with the node "face_16", or the connections between the node "face_16" and the nodes "face_15", "face_17", "face_18", "face_19" can be ranked in accordance with the list.

In these examples, the generation has been shown for the case the complete surface of the mesh is processed. It is worth mentioning that the representation does not necessarily need to be complete, that is, the generation can only cover a part of the mesh. The generated structured 3D model is still useful, despite it does not resent exactly all the details of the original mesh.

The structured 3D model generated from a mesh may be edited by a user. Edition of the structured 3D model be performed by a user in any manner known from the field of CAD, such as comprising selection of at least one node or connection. Such edition presents ergonomics characteristics compared to edition of a discrete geometrical representation such as the mesh. In particular, the editable structured 3D model may comprise a number of nodes/connections lower than the number of discrete geometrical entities of the input mesh by a factor higher than 5. The editable structured 3D model thus represents the 3D shape in a more compact and organized manner compared to the mesh. Also, acting on a single node or connection of the structure 3D model may present a global impact, while in the case of a mesh acting on a single geometrical entity only presents a local impact. For example, any node or connection of the structured 3D model herein may be configured for identifying a set of faces of a region, as opposed to individually selecting a high number of mesh triangles. In addition, a structured 3D model is semantically more meaningful to a user than a mesh.

The edition may comprise selecting a graphical item (a node, a connection), for example by graphical-interaction. Graphical-interaction herein means operating a haptic device to activate pixels at a location corresponding to the position of the graphical item on the display. For example, a mouse cursor may be positioned over the displayed graphical item, or the displayed graphical item may be touched directly via a touch screen or indirectly via a touch pad. The selection may trigger opening of a dialog box or the like, and entering one or more parameter values by the user, for example via a keyboard.

In examples, the method may comprise displaying a graphical representation of the provided mesh, and meanwhile, by a user, launching the method for generating the structured 3D model from the mesh, and as a result, displaying the graphical representation of the structured 3D model simultaneously to the graphical representation of the discrete geometrical representation. The user may then hide the graphical representation of the mesh for edition of the structured 3D model. Alternatively, the method may continue to display both graphical representations of the mesh and the structured 3D model simultaneously, and upon the user performing an edition on structured 3D model, the method may update (e.g. change) the graphical representation of the mesh accordingly. This provides visual feedback to the user performing editions. Inversely, the user can modify the provided mesh, e.g. by displacing one or more elements forming the mesh (vertices, edges, faces . . . ) and update the structured 3D model by executing the method.

In examples, the method is configured for taking as input a 3D mesh or 3D point cloud determined from physical measurements on a real object, and the method allows determining a corresponding editable feature tree representing the 3D shape of the real object. A user may then perform editions of the structured 3D model, for example to create a design resembling the real object but different therefrom. In alternative and additional examples, the method is configured for taking as input a 3D mesh of a 3D modeled object having no corresponding structured 3D model, received from a distant computer system or retrieved from non-volatile memory, and the method allows determining a corresponding structured 3D model representing the 3D shape. A user may then perform editions of the structured 3D model, for example to create a design resembling the 3D mesh but different therefrom, or to complete the design formed by the 3D mesh.

In addition or alternatively to the possibility of performing editions of the 3D shape in a more ergonomic manner, the obtention of the structured 3D model may serve other purposes, such as extracting a feature tree from the provided mesh. A feature tree is a hierarchical organization that contains the history of solid operations performed on three-dimensional (3D) solid model. Each solid operation is defined as a feature on the solid. The extrude/revolve operation that creates a solid from a sketch (and the direction/length/angle parameters) is also a feature of the feature tree. An operation is a Boolean operation such as an add operation or a remove operation. The solid used for applying the Boolean operation is typically obtained from a sketch on which an extrusion operation is applied. In an example, the feature tree is a CSG (Constructive solid geometry) feature tree. CSG modeling is a well-known technique used in solid modeling that comprises using Boolean operations for combining simple objects in order to generate complex objects.

The simplest solid objects used for the representation are called primitives that have simple shape such as cuboids, cylinders, prisms, pyramids, spheres, cones. A feature tree improves the possibility of performing editions of the 3D shape in a more ergonomic manner. In addition, the obtention of the feature tree may serve other purposes, such as 3D shape merging or mechanical simulation.

A 3D shape merging method may comprise providing, at a computer system, a first feature tree representing a first 3D shape, providing a mesh of a second 3D shape, performing the method on the mesh to obtain a second feature tree representing the second 3D shape, and merging the first feature tree and the second feature tree. The merging may be performed according to any merging technique and/or to represent a mechanical assembly or a mechanical cooperation between the first 3D shape and the second 3D shape. The merging may for example comprise connecting the second tree to the first tree. The 3D shape merging method may further comprise applying a geometric model to the merged tree so as to obtain a graphical representation of the 3D shape thereby represented, and/or display said graphical representation to a user.

A mechanical simulation may be performed based on the feature tree. Indeed, since the feature tree represents the 3D shape in a compact (relative to the discrete geometrical representation) and parameterized manner, mechanical computations may be performed more accurately on the feature obtained with the present method. In particular, it is easier and more direct to calculate a finite element mesh from a CSG (as taught by paper "Finite-element mesh generation from constructive-solid-geometry models", Edwin Boender, Willem F. Bronsvoort, Frits H. Post, in Computer-Aided Design, Volume 26, Issue 5, May 1994, Pages 379-392 or by paper "Finite element mesh generation methods: a review and classification", K Ho-Le, in 38 Computer-Aided Design, volume 20 number 1 January/February 1988). In addition, the CSG offers guarantees of waterproofness of the surface. The mechanical simulation may thus comprise computing one or more finite element meshes from the feature tree (e.g. CSG) and/or one or more modifications thereof, and then performing a finite element analysis based on each finite element mesh. Also, one can easily optimize a CSG according to the results of simulation since the CSG is parameterized. Thus, the one or more modifications may be for optimizing the editable feature tree (e.g. CSG) based on each previous finite element analysis result.

The invention claimed is:

1. A computer-implemented method for generating, with a CAD system, a structured three-dimensional (3D) model from a mesh, comprising:
    obtaining a mesh that includes faces, each face of the mesh including a normal and principal curvature values;
    computing a distribution of the principal curvature values over the whole mesh by counting the number of occurrences of discretized curvature values;
    identifying in the computed distribution one or more dominant ranges of principal curvature values;
    for each identified dominant range, computing one or more regions of the mesh that comprises faces belonging to the identified dominant range;
    for each computed region, applying a region growing, the grow being guided by a distance between faces, the distance being weighted by the curvature values to aggregate all faces not already assigned to a computed region; and
    for each computed region, detecting a primitive type by using the curvatures values of all faces of the region and identifying parameters of the detected primitive by using the mesh surface of the region.

2. The computer-implemented method of claim 1, further comprising:
    building a geometric and adjacency graph of the structured 3D representation of the provided mesh, wherein:
    each node of the graph represents one of the computed regions and comprises the identified primitive type and parameters of the region, and
    each connection between two nodes is an intersection between the respective surfaces of the regions represented by the nodes.

3. The computer-implemented method of claim 2, wherein the building of a geometric and adjacency graph further includes, for each connection:
    designating each connection between two nodes as an intersection between the respective surfaces of the regions represented by the nodes with associated convexity, concavity and positions information per connection between nodes.

4. The computer-implemented method of claim 1, wherein the identification in the computed distribution of the one or more dominant ranges of principal curvature values includes:
    determining in the computed distribution a local maximum between two successive local minima, and
    identifying the faces comprised between the two successive local minima as belonging to the said one or more a dominant range.

5. The computer-implemented method of claim 4, wherein, while the number of occurrences for a local maximum is equal and/or above a predetermined value, repeating the determination in the computed distribution a local maximum and the identification of the faces as belonging to the said one or more dominant range, and
    wherein before each repetition, the faces previously identified as belonging to the said one or more a dominant range are discarded and the distribution of the faces according to their principal curvature values is recomputed.

6. The computer-implemented method of claim 1, wherein:
    the principal curvature values of each faces comprise a minimum curvature value and a maximum curvature value,
    wherein computing the distribution of the faces includes:
    computing a first distribution of the minimum curvature values over the whole mesh by counting the number of occurrences of discretized curvature values, and
    computing a second distribution of the maximum curvature values over the whole mesh by counting the number of occurrences of discretized curvature values, and
    wherein subsequent steps of the method are performed for the first and second distributions.

7. The computer-implemented method of claim 1, further comprising:
    applying a Gaussian kernel is to the resulting distribution.

8. The computer-implemented method of claim 1, wherein the region growing includes:
    assigning a same first score to the faces of a first set of faces, the first set of faces comprising the faces belonging to none of the computed regions, and assigning a same second score of zero for each face belonging to one of the computed regions, the first score being larger than the second score, testing each face of the first set by:

for each adjacent regions of the face, computing a third score being based on a distance between the face and the adjacent region and on a difference in principal curvature values between the face and the adjacent region, if the third score is smaller than the first score:

setting the first score to the third score and recording to which region the third score corresponds, and adding the neighbors of the tested face to the first set of faces if the neighbors do not belong to the first set of faces, if the third score is larger than the first score, removing the tested face from the first set, and regrouping the tested faces initially in the first set with the region associated with the best third score they have.

9. The computer-implemented method of claim 1, wherein the testing stops when all the faces of the second set have been tested.

10. The computer-implemented method of claim 1, further comprising after computing regions of the mesh, computing intersection loops between the computed regions.

11. The computed-implemented method of claim 10, further comprising, after the computation of intersection loops, for each intersection loop:

collecting an ordered list of regions composing this intersection loop, and concavity, convexity and position information for each edge of the said intersection loop.

12. The computed-implemented method of claim 1, wherein the identifying parameters of the primitive by using a surface for the region comprises estimating parameters of the detected primitive with a least optimization of those parameters.

13. A non-transitory computer readable medium having recorded thereon a computer program comprising instructions for performing a method for generating a structured three-dimensional (3D) model from a mesh, the method comprising:

obtaining a mesh that comprises faces, each face of the mesh including a normal and principal curvature values;

computing a distribution of the principal curvature values over the whole mesh by counting the number of occurrences of discretized curvature values;

identifying in the computed distribution one or more dominant ranges of principal curvature values;

for each identified dominant range, computing one or more regions of the mesh that includes faces belonging to the identified dominant range;

for each computed region, applying a region growing, the grow being guided by a distance between faces, the distance being weighted by the curvature values to aggregate all faces not already assigned to a computed region; and for each computed region, detecting a primitive type by using the curvatures values of all faces of the region and identifying parameters of the detected primitive by using the mesh surface of the region.

14. The non-transitory computer readable medium of claim 13, further comprising:

building a geometric and adjacency graph of the structured 3D representation of the provided mesh, wherein:

each node of the graph represents one of the computed regions and comprises the identified primitive type and parameters of the region, and each connection between two nodes is an intersection between the respective surfaces of the regions represented by the nodes.

15. The non-transitory computer readable medium of claim 14, wherein the building of a geometric and adjacency graph further comprises, for each connection:

designating each connection between two nodes as an intersection between the respective surfaces of the regions represented by the nodes with associated convexity, concavity and positions information per connection between nodes.

16. The non-transitory computer readable medium of claim 13, wherein the identification in the computed distribution of the one or more dominant ranges of principal curvature values includes:

determining in the computed distribution a local maximum between two successive local minima, and identifying the faces comprised between the two successive local minima as belonging to the said one or more a dominant range.

17. The non-transitory computer readable medium of claim 16, wherein, while the number of occurrences for a local maximum is equal and/or above a predetermined value, repeating the determination in the computed distribution a local maximum and the identification of the faces as belonging to the said one or more dominant range, and wherein before each repetition, the faces previously identified as belonging to the said one or more a dominant range are discarded and the distribution of the faces according to their principal curvature values is recomputed.

18. The computer readable medium of claim 13, wherein:

the principal curvature values of each face includes a minimum curvature value and a maximum curvature value;

wherein the computing the distribution of the faces includes:

computing a first distribution of the minimum curvature values over the whole mesh by counting the number of occurrences of discretized curvature values, and computing a second distribution of the maximum curvature values over the whole mesh by counting the number of occurrences of discretized curvature values; and wherein subsequent steps of the method are performed for the first and second distributions.

19. A system comprising:

a processor coupled to a memory and a graphical user interface, the memory having recorded thereon a computer program comprising instructions for generating a structured three-dimensional (3D) model from a mesh that when executed by the processor causes the processor to be configured to:

obtain a mesh that comprises faces, each face of the mesh including a normal and principal curvature values, compute a distribution of the principal curvature values over the whole mesh by counting the number of occurrences of discretized curvature values;

identifying in the computed distribution one or more dominant ranges of principal curvature values, for each identified dominant range, compute one or more regions of the mesh that includes faces belonging to the identified dominant range, for each computed region, apply a region growing, the grow being guided by a distance between faces, the distance being weighted by the curvature values to aggregate all faces not already assigned to a computed region, and for each computed region, detect a primitive type by using the curvatures values of all faces of the region and identifying parameters of the detected primitive by using the mesh surface of the region.

* * * * *